United States Patent
Praisner et al.

(10) Patent No.: US 7,251,592 B1
(45) Date of Patent: Jul. 31, 2007

(54) BOUNDARY LAYER TRANSITION MODEL

(75) Inventors: Thomas J. Praisner, Colchester, CT (US); Eric A. Grover, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 110 days.

(21) Appl. No.: 10/921,486

(22) Filed: Aug. 18, 2004

Related U.S. Application Data

(60) Provisional application No. 60/496,189, filed on Aug. 18, 2003, provisional application No. 60/496,190, filed on Aug. 18, 2003.

(51) Int. Cl.
*G06G 7/48* (2006.01)
*G06G 7/50* (2006.01)

(52) U.S. Cl. .................. 703/9; 703/2; 703/6; 73/432.1; 244/204

(58) Field of Classification Search ............ 703/2, 703/9; 73/432.1; 244/204
See application file for complete search history.

(56) References Cited

U.S. PATENT DOCUMENTS

| | | | | |
|---|---|---|---|---|
| 4,727,751 | A | * | 3/1988 | Holmes et al. ............ 73/147 |
| 4,822,249 | A | * | 4/1989 | Eckardt et al. ........... 416/235 |
| 4,848,153 | A | * | 7/1989 | Stack et al. ............. 73/432.1 |
| 4,936,146 | A | * | 6/1990 | Stack et al. ............. 73/432.1 |
| 5,022,337 | A | * | 6/1991 | Caldwell ............... 114/39.15 |
| 5,209,438 | A | * | 5/1993 | Wygnanski ............... 244/203 |
| 5,901,928 | A | * | 5/1999 | Raskob, Jr. .............. 244/204 |
| 6,705,838 | B1 | * | 3/2004 | Bak et al. ............... 416/243 |

OTHER PUBLICATIONS

Lou, Weiliang and Jean Hourmouziadis. "Separation Under Steady and Periodic-Unsteady Main Flow Conditions." Journal of Turbomachinery. Oct. 2000. vol. 122, Issue 4. Abstract Only.*
Sohn, Ky-Hyeon et al. "Experimental Investigation of Boundary Layer Behavior in a Simulated Low Pressure Turbine." Jun. 1998. NASA/TM—1998-207921.*
Häggmark, Carl. "Investigations of Disturbances Developing in a Laminar Separation Bubble Flow." Mar. 2000. Technical Reports from the Swedish Royal Institute of Technology, Dept. of Mechnaics, Stockholm Sweden.*

(Continued)

*Primary Examiner*—Paul Rodriguez
*Assistant Examiner*—Ayal Sharon
(74) *Attorney, Agent, or Firm*—Bachman & LaPointe, P.C.

(57) ABSTRACT

A method for analyzing performance of an airfoil includes determining: an estimated laminar separation location; a freestream turbulence intensity; a momentum thickness; and a turbulence length scale. Based upon the freestream turbulence intensity, momentum thickness, and turbulence length scale, a first momentum thickness Reynolds number associated with a first estimated laminar/turbulent boundary transition location along the airfoil is determined. If the estimated laminar separation location is downstream of the first estimated transition, the first estimated transition is used to determine a spatial domain for running a turbulent flow model. If the estimated laminar separation location is upstream of the first estimated transition, a second estimated transition location is used to determine a spatial domain for running the turbulent flow model. The second estimated transition location is determined as a function of a momentum thickness Reynolds number associated with the estimated laminar separation location.

20 Claims, 7 Drawing Sheets

OTHER PUBLICATIONS

Introduction to Computational Fluid Dynamics. Printed Apr. 13, 2007. http://www.cham.co.uk/website/new/cfdintro.htm.*

Robert Edward Mayle, The Role of Laminar-Turbulent Transition in Gas Turbine Engines, Journal of Turbomachinery. Oct. 1991, pp. 509-537, vol. 113.

B.J. Abu-Ghannam et al., Natural Transition of Boundary Layers-the Effects of Turbulence, Pressure Gradient, and Flow History, Journal Mechanical Engineering Science, 1980, pp. 213-228, vol. 22.

* cited by examiner

BOUNDARY LAYER TRANSITION MODEL

CROSS-REFERENCE TO RELATED APPLICATIONS

Benefit is claimed of U.S. Patent Application Ser. No. 60/496,189, filed Aug. 18, 2003 and entitled "Boundary Layer Transition Model". Additionally, U.S. Patent Application Ser. No. 60/496,190, filed Aug. 18, 2003 and copending U.S. patent application Ser. No. 10/921,786, now issued as U.S. Pat. No. 7,150,427, disclose and claim an attached laminar/turbulent transition model that, below, is discussed and combined with the present separated boundary layer transition model. The disclosures of Ser. Nos. 60/496,189 and 60/496,190 are incorporated by reference herein as if set forth at length.

BACKGROUND OF THE INVENTION

The invention relates to computational fluid dynamics (CFD). More particularly, the invention relates to the design of airfoils for turbomachinery.

Many turbomachines feature sections characterized by alternating circular arrays (often referred to as "rows") of airfoils. Alternating, oppositely-oriented, rows of rotating blade and fixed vane airfoils may be present in any given section. Performance of the turbomachine is influenced by the size, positioning, and shape of these airfoils. CFD means are commonly used to optimize parameters for desired performance (e.g., efficiency) in desired operating conditions. The behavior of boundary layers, especially on the suction sides of the airfoils, strongly influences airfoil performance. The boundary layer will start as a laminar flow and then typically transition to a turbulent flow. The boundary layer may also separate from the airfoil. The separated boundary layer may then reattach.

Standard practice in the industry is to perform CFD simulations solving the Reynolds Average Navier-Stokes equations with a two-equation turbulence model. The turbulence model is disabled in the laminar portion of the boundary layer. Thus one must know: (a) the location of the boundary between the boundary layer and freestream; and (b) the location on the airfoil at which the boundary layer transitions from laminar to turbulent flow. The former is straightforward and may be done by analyzing the flowfield resulting from a converged CFD solution, which used either fully laminar or fully turbulent models. The latter is more difficult.

It has long been known that freestream turbulence plays a key role in determining the location of the boundary layer transition. A relationship between a critical momentum thickness-based Reynolds number on the one hand and the freestream turbulence intensity and a pressure gradient parameter on the other hand is disclosed in Abu-Ghannam B. J., Shaw R., Natural Transition of Boundary Layers—the Effects of Turbulence, Pressure Gradients and Flow History", J. Mech. Eng Sci., Vol. 22, pp. 213-228, 1980. A relationship between that critical Reynolds number and the freestream turbulence intensity is disclosed in Mayle, R. E., "The Role of Laminar-Turbulent Transition in Gas Turbine Engines", ASME Journal of Turbomachinery, Vol. 113, pp. 509-537, 1991.

In addition to modeling transition in attached flow situations, it is advantageous to model transition in separated flow situations. One model for this is disclosed in Roberts, W. B., "Calculation of Laminar Separation Bubbles and Their Effect on Airfoil Performance," AIAA Journal, Vol. 18, No. 1. pp. 25-31, 1980. The Roberts model relates a momentum thickness-based Reynolds number to the turbulence intensity multiplied by an exponent of the quotient of the chord of the airfoil divided by the turbulence length scale. Nevertheless there is room for further improvement in transition modeling.

SUMMARY OF THE INVENTION

Accordingly, one aspect of the invention involves a method for analyzing performance of a body (e.g., an airfoil). An estimated laminar separation location of a flow separating from the airfoil is determined. Freestream turbulence intensity is determined. A momentum thickness is determined. A turbulence length scale is determined. Based upon the freestream turbulence intensity, momentum thickness, and turbulence length scale, a first momentum thickness Reynolds number associated with a first estimate of the laminar/turbulent boundary layer transition location along the airfoil is determined. If the laminar separation location is downstream of the first estimate transition location, the first estimated transition location is used to determine a spatial domain for running a turbulent flow model. If the laminar separation location is upstream of the first estimated transition location, a second estimated transition location is used to determine a spatial domain for running the turbulent flow model. The second estimated transition location is determined as a function of a momentum thickness Reynolds number associated with the estimated laminar separation location.

In various implementations, it may be determined whether the flow reattaches to the airfoil and/or a location of reattachment of the flow. The determination of the laminar separation location may include determining an arc distance from a stagnation point to the laminar separation location. The determination of the second estimated laminar/turbulent boundary transition location may include determining a distance of the second estimated laminar/turbulent boundary transition location from the estimated laminar separation location as a constant multiplied by a streamwise position of the estimated laminar separation location and multiplied by an exponent of a momentum thickness based Reynolds number associated with the estimated laminar separation location. The exponent may be −(1.22-1.32). The constant may be 211-221.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

A missing element from prior transition modeling is the turbulence length scale $\lambda_x$ which may be measured at the boundary layer edge. We have determined that this parameter, along with the turbulence intensity and momentum thickness, may be used to predict the transition from laminar to turbulent conditions.

At any given streamwise location, the momentum thickness-based Reynolds number may be identified as:

$$\text{Re}_\theta = \frac{\theta \rho U_\infty}{\mu}$$

where $\theta$ is the momentum thickness at such location, $\rho$ is the density at the boundary layer edge at such location, $U_\infty$ is the flow velocity at the boundary layer edge at such location, and $\mu$ is the viscosity at the boundary layer edge at such location. The turbulence intensity may be identified as:

$\text{Tu} = 100(u'/U_\infty)$ where $u'$ is the fluctuating component of velocity calculated at the boundary layer edge at such location.

With the foregoing in mind, we have found that transition occurs when $\text{Re}_\theta$ reaches a critical value $\text{Re}_{\theta onset}$ onset which may be identified as:

$$\text{Re}_{\theta onset} = A\left(\frac{Tu\theta}{\lambda_x}\right)^B$$

for a variety of turbulence models where A and B are constants that may be associated with a particular model. In one implementation of the k-omega model, $A=8.52$ and $B=-0.956$. For any given turbulence model the constants may be determined by substituting in experimental laboratory data from at least two distinct operating conditions.

Figure 1:
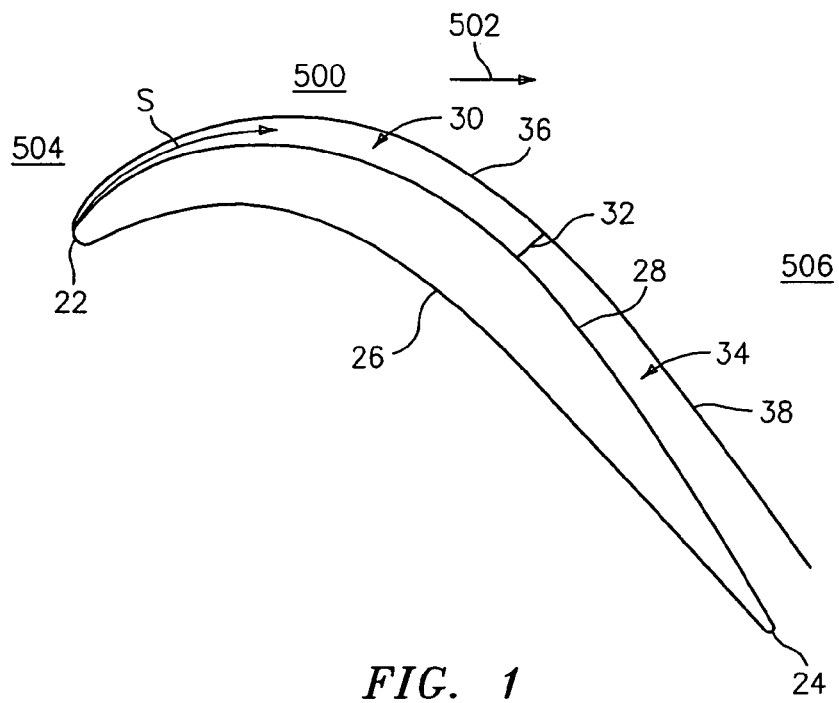
FIG. 1 is a schematic sectional view of an airfoil in a flowfield.

The forgoing transition model may be applied to modeling the performance of an airfoil 20 (FIG. 1) and optimizing the shape of such airfoil for a desired operating condition or range of conditions. The airfoil 20 has a leading edge 22 and a trailing edge 24 and pressure and suction side surfaces 26 and 28. The airfoil is located in a flowfield 500 having a generally downstream direction 502. The boundary layer may extend aft along each of the surfaces 26 and 28. Typically, boundary layer modeling is critical on the suction side 28 and is often ignored on the pressure side 26. Although discussed below with respect to the suction side, the principles of the invention may also be applied to pressure side modeling. A laminar upstream portion 30 of the suction side boundary layer extends downstream from a stagnation point at the leading edge 22. A transition location 32 divides the laminar portion from a downstream turbulent portion 34. The boundary layer edge or boundary has associated upstream and downstream portions 36 and 38 in the laminar and turbulent regions. A streamwise distance S is shown along the suction side measured downstream from the leading edge stagnation point.

In an exemplary CFD implementation, the input conditions at locations 504 upstream of the airfoil are known or assumed. For example, for the first airfoil row in a high pressure turbine, these conditions may be known from measurement or modeling of the engine combustor at a target operating condition. For subsequent rows, the upstream conditions may be taken from the conditions at downstream location 506 of the row thereahead. Modeling of the various rows may, thus, occur simultaneously in a similar fashion.

An exemplary implementation may involve a first process for obtaining an initial estimated transition location. A first step is the generation of an appropriate CFD mesh whose boundaries are defined by the airfoil under consideration and the flowpath in which the airfoil resides. The CFD mesh will not contain flow property information until a first initialization process is performed using the known or assumed upstream and downstream flow conditions. Initially, the turbulence model is turned on throughout the flowfield including the areas which might end up being within the boundary layer portions 30 and 34. The model may be run until convergence. Upon convergence, the data is analyzed. The analysis determines an initial estimate for the boundary layer edge. For each streamwise location along the suction side surface between leading and trailing edges, a series of parameters may be calculated and stored. The number of streamwise locations may depend on the resolution of the flowfield. These parameters include the density $\rho$, the velocity $U_\infty$ and the viscosity $\mu$. An integration normal to the surface provides a value of $\theta$ and the values of $u'$, $\lambda_x$, and Tu may also be calculated and stored. The values of $\text{Re}_\theta$ and $\text{Re}_{\theta onset}$ may then be calculated and stored. The streamwise position where these two values are equal provides the initial estimated transition location.

For given operating conditions and airfoils (the size, shape, orientation and positioning/spacing of the airfoils of each row) a CFD simulation may then be run with the turbulence model shut-off in the flow region upstream of the initial target transition using the boundary determined by the fully turbulent simulation. Once run to convergence, $\text{Re}_\theta$ and $\text{Re}_{\theta onset}$ are recalculated to determine an updated transition location. Concurrently, the boundary layer edge location is updated using the results of the converged solution. The CFD simulation is then restarted using the updated target transition location and run to convergence. This process may be repeated with each updated estimate of the transition location until there is convergence of such transition location. With such final convergence, the pressure distributions and total pressure/temperature changes across the airfoil row may be calculated to determine the performance (e.g., including loss characteristics) of the airfoils of each row and of the multi-row system overall.

Further iterations may be made under one or more additional operating conditions if desired. With small changes in operating conditions, one need not necessarily restart the simulation from scratch. Instead, one may start the analysis by using the flowfield parameters from a prior set of conditions and allow refinements.

Yet subsequent design iterations may be made to analyze changes in the shapes of the airfoils of the various rows (said shapes potentially differing from row-to-row). The airfoil shape changes may be realized via manual or computer-guided means (e.g., optimizer software). Using the transitional CFD methodology described in the preceding paragraphs for each airfoil, the performance characteristics of the airfoil (e.g., loss and loading) can be calculated with more fidelity than previously available. Comparisons of said airfoil geometric shapes, and their resultant performance characteristics, can be used to guide subsequent improvements to the airfoil geometric shape in an effort to produce a better performing airfoil. Again, for each set of changed airfoils, the simulation may be run across the desired range of operating conditions.

Figure 2:
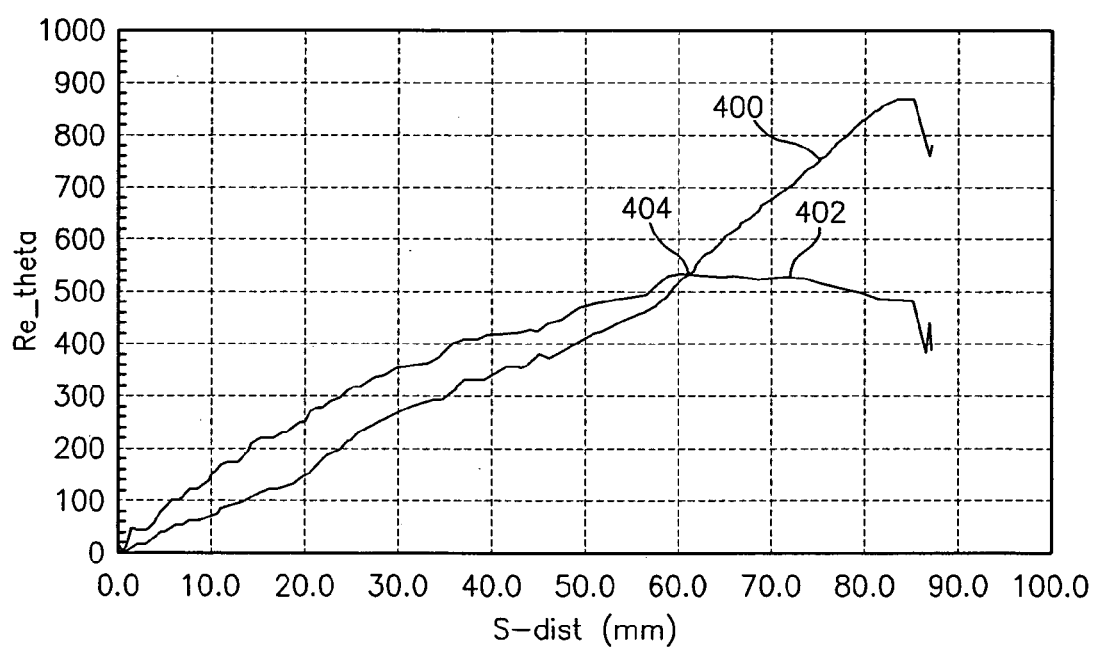
FIG. 2 is a graph showing the calculation of the onset value of momentum thickness-based Reynolds number.

For further reference, FIG. 2 shows exemplary graphs 400 and 402 of $Re_\theta$ and $Re_{\theta onset}$, respectively, against the S distance in millimeters for an exemplary airfoil under exemplary conditions. Their intersection 404 determines the streamwise position of transition.

Figure 3:
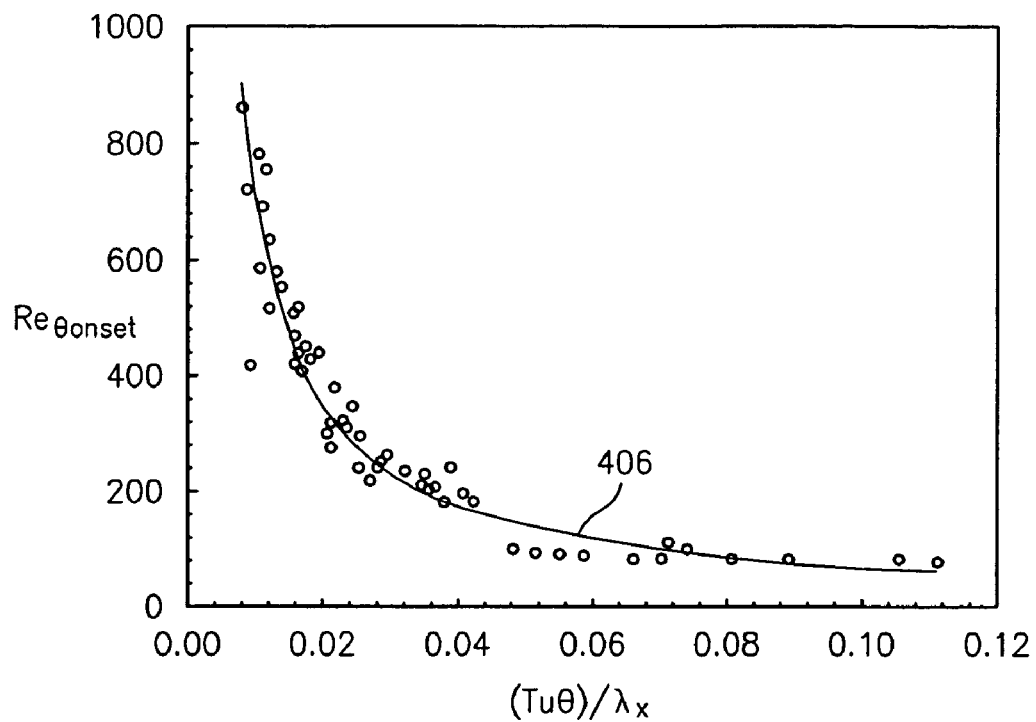
FIG. 3 is a graph of such calculated Reynolds number against a composite turbulence and momentum parameter along with experimental data points.
Figure 4:
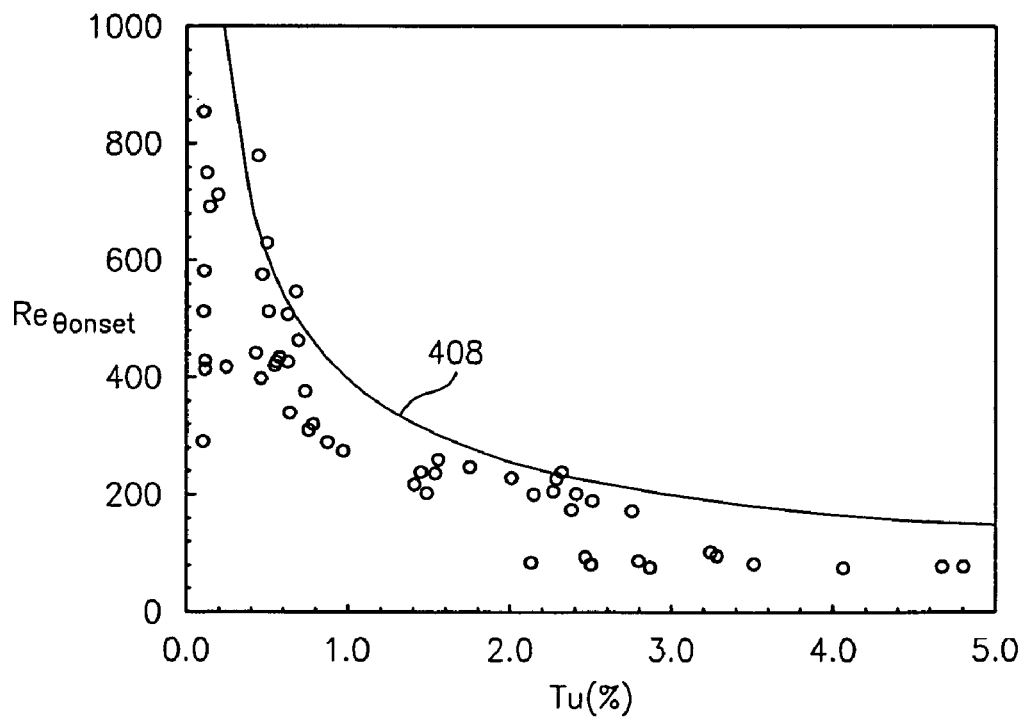
FIG. 4 is a graph of a prior art calculated Reynolds number against turbulence along with the experimental data points.

FIG. 3 shows a graph of experimentally-based values of $Re_{\theta onset}$ against $Tu\theta/\lambda_x$, with a curve 406 representing a best fit of the $Re_{\theta onset}$ model. The experimentally-based values are determined by measuring the streamwise location of onset in cascade tests and then using a laminar model to find the $Re_\theta$ at such streamwise location. By way of comparison, FIG. 4 shows the values of $Re_{\theta onset}$ against Tu with a Mayle model graph 408.

Figure 6:
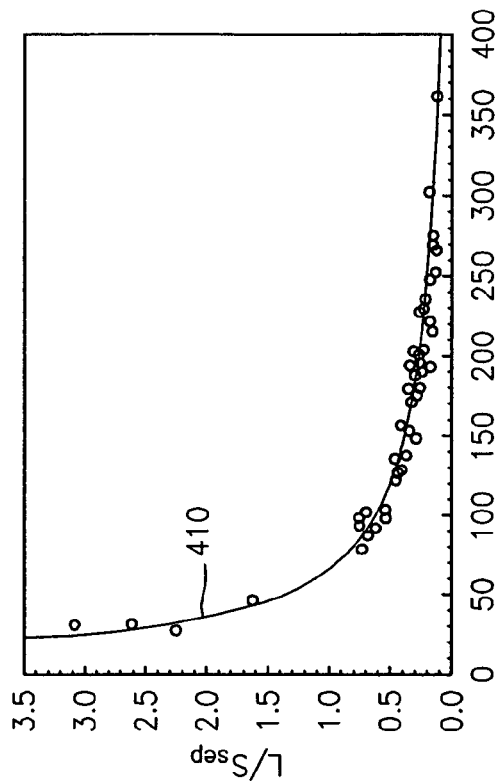
FIG. 6 is a schematic sectional view of an airfoil with a separated boundary layer.
Figure 5:
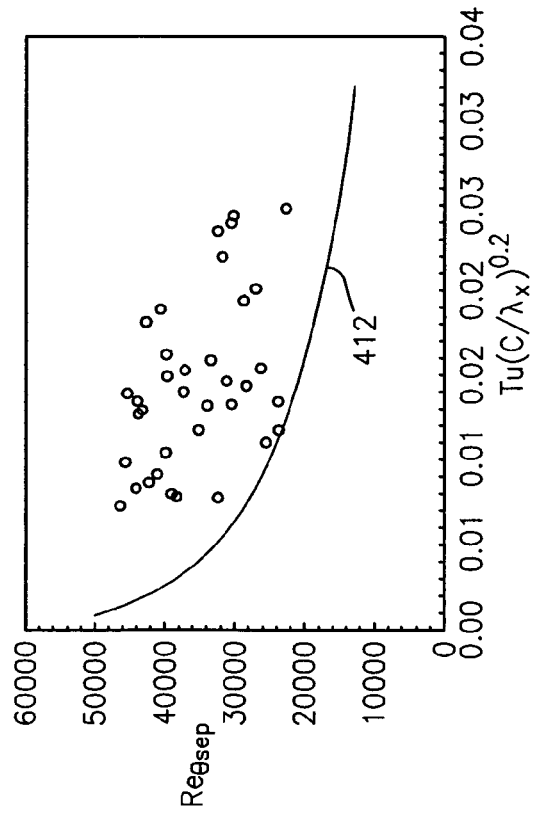
FIG. 5 is a schematic sectional view of an airfoil with a separated/reattached boundary layer.

The foregoing attached transition model has its limitations. As airfoil performance is further increased (e.g., enhanced lift of each airfoil permitting reduction in the numbers of airfoils), the airfoils may begin to suffer from laminar flow separations. If the CFD simulations show that the boundary layer separates downstream of the predicted attached-flow transition point, the attached-flow transition point should remain valid. If however the boundary layer separates upstream of the predicted attached-flow transition point, the predicted transition point will likely be invalid. An alternate model is then required to predict the transition location. From a database of experimental cascade and flat plate tests supplemented with CFD-based simulations of the experimental tests, in a range of turbine-specific flow parameters, we have constructed a model to predict the transition location in such a situation. FIG. 5 shows a separation location 50 which may be determined from the CFD simulation described above. The transition 32 between laminar and turbulent conditions is shown at a streamwise distance L from the location 50. The streamwise position of location 50 is designated as $S_{sep}$. Generally, if L is such that the transition 32 occurs upstream of the trailing edge 24, there is a good chance that the boundary layer will reattach leaving a trapped separation bubble 52. The presence of such a trapped separation bubble may not terribly adversely affect performance. However, if the transition is near or downstream of the trailing edge, the boundary layer is not likely to reattach (FIG. 6) and is, therefore, likely to represent a high loss situation. By accurately determining L and permitting the turbulence model to be accurately employed downstream of the transition, the flow parameters may more closely be determined in order to predict exactly how the separation has affected performance.

The CFD and experimental tests have indicated a relation of the form:

$$\frac{L}{S_{sep}} = CRe_{\theta sep}^D.$$

where C=216 and D=−1.227.

Figure 7:
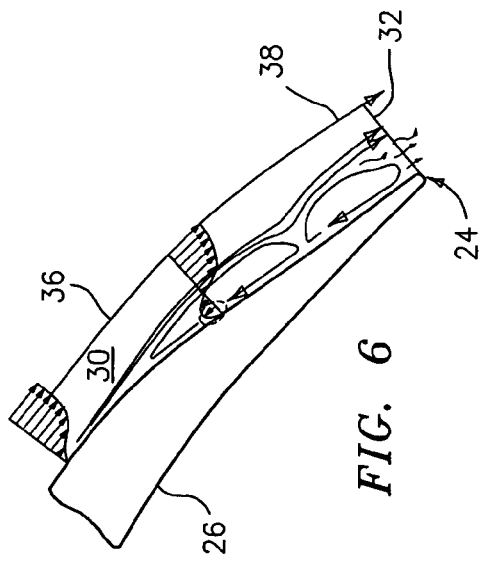
FIG. 7 is a graph of calculated values of a quotient of a separation-to-transition distance divided by a separation streamwise location against a momentum thickness-based Reynolds number at the separation location.
Figure 8:
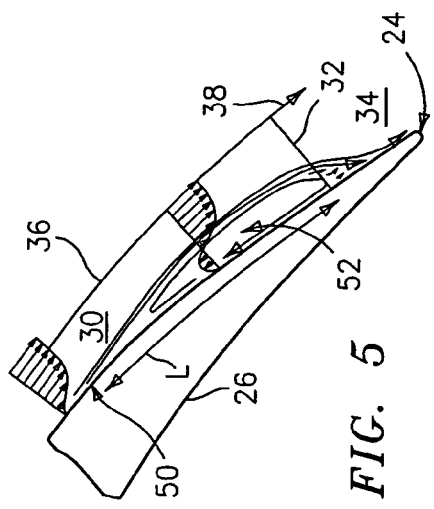
FIG. 8 is a graph of a prior art calculated Reynolds number against the product of a turbulence intensity with an exponent of a turbulence length scale divided by a separation-to-transition length.

FIG. 7 shows a plot 410 of the foregoing relationship against experimental data. By way of contrast FIG. 8 shows a plot 412 of the Roberts model against such data. The Roberts model plots a Reynolds number $Re_\theta$ against the turbulence intensity multiplied by an exponent (i.e., 0.2) of the quotient of the chord C of the airfoil divided by the turbulence length scale. It can be seen that the Roberts correlation tends to represent a lower limit on the separation size for a given value of $Re_\theta$ at separation. This means the Roberts model may tend to be biased toward predicting flow reattachment and low loss in cases where stall (and thus high loss) actually occur. The present separated boundary layer transition model may be incorporated into the attached flow modeling described above.

Figure 9:
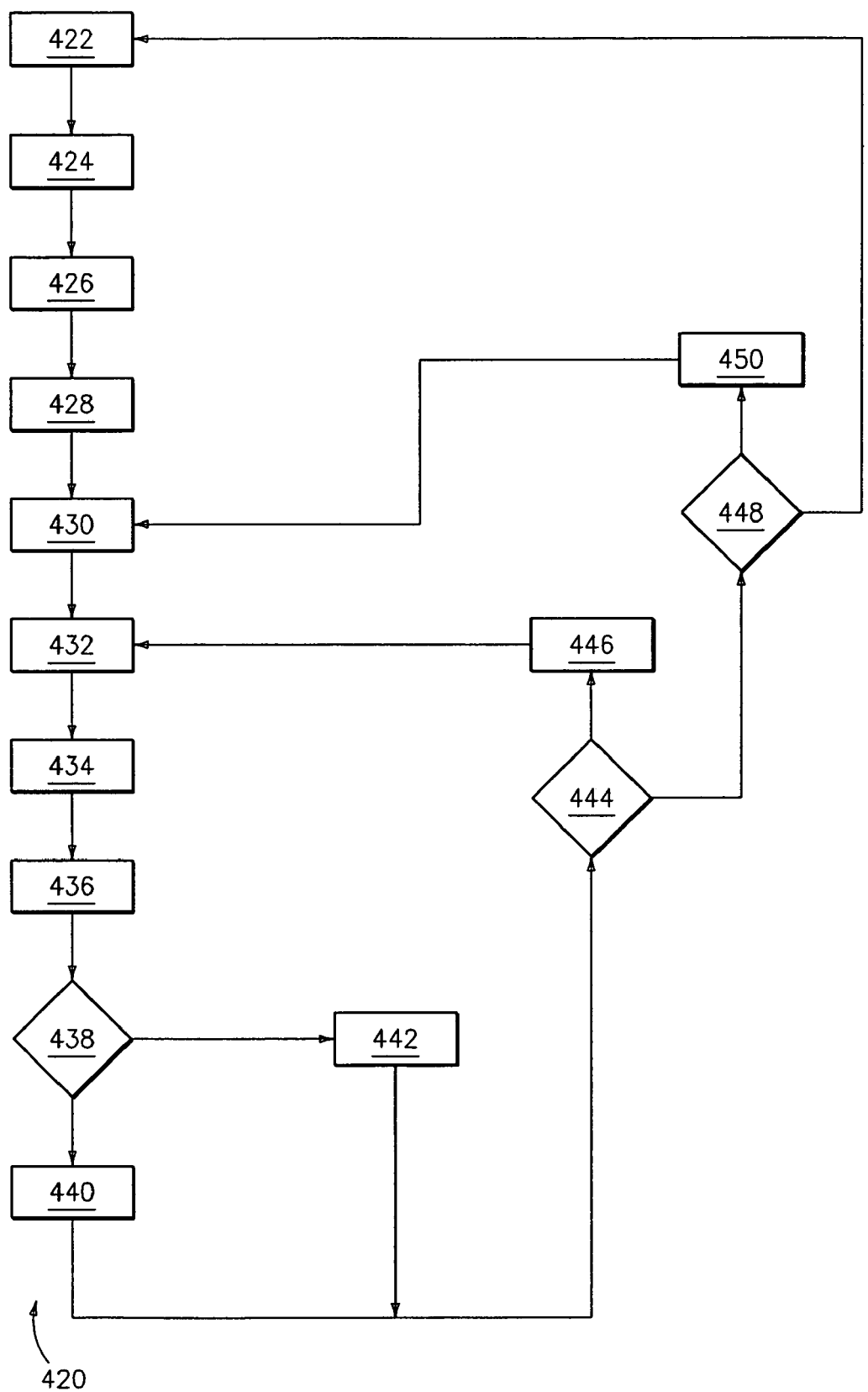
FIG. 9 is a flowchart of a CFD modeling procedure.

FIG. 9 shows an exemplary flowchart of a process 420. Block 422 identifies a start/resume CFD simulation block. It is followed by a flowfield iteration block 424 which may represent a fixed number of iterations (e.g., 500 iterations) or iterations to a given convergence, or the like. It is followed by block 426 which identifies a pause in the CFD simulation to allow for the processing of the flowfield and the updating of the predicted transition location. This is followed by block 428 which identifies the beginning of a sidewise loop on the suction side of the airfoil to update the transition locations. This, in turns, is followed by spanwise loop 430 at discrete locations along the span from the inboard to outboard extremes of the airfoil. Subsequent block 432 identifies finding the leading edge flow stagnation location denoting the split between the airfoil pressure and suction sides. Subsequent block 434 identifies the calculation of the $R_\theta$ and $R_{\theta onset}$ distributions between the stagnation point and the trailing edge. Subsequent block 436 identifies checking for a boundary layer separation and the storing of its location (if any). Subsequent decision block 438 identifies the determination of whether a laminar separation exists. If not, a subsequent block 440 identifies the use of prediction from the attached flow model to update the transition location. If so, however, block 442 identifies use of the prediction from the separated flow model to update the transition location. Either block 440 or 442 are followed by a decision block 444 determining whether the spanwise loop is complete. If not, following block 446 identifies incrementing the spanwise location and returning to block 432 for the incremented location. If so, however, decision block 448 determines whether the side-wise loop is complete. If not, the block 450 identifies transition to the other (e.g. pressure) side of the airfoil followed by return to block 430 for such other side. If so, there is returned to block 422 for continued CFD iterations.

Figure 10:
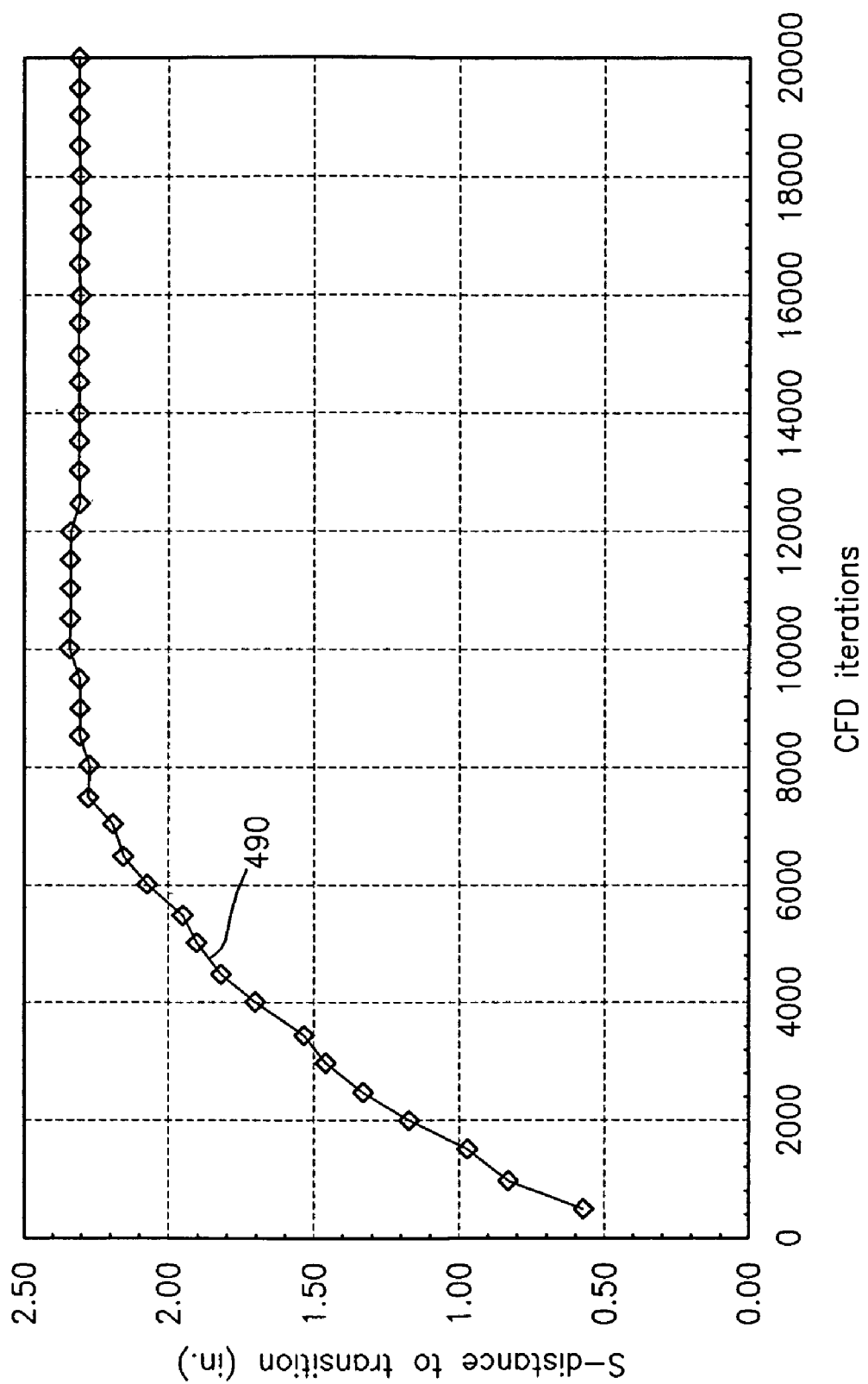
FIG. 10 is a graph showing iteration history of a separation-to-transition distance.

FIG. 10 shows a plot 470 for values of the streamwise distance from the stagnation point to transition location (in inches) against the number of CFD iterations. It can be seen that, for this particular case rough stability occurs in the vicinity of 10,000 iterations, with further stability at greater number (e.g. over 15,000) and much less stability at lower numbers (e.g. less than 6,000).

The foregoing procedure may itself be iterated using manual optimization or optimizer software to reengineer airfoil shape, orientation, and/or number to achieve a desired goal.

Figure 11:
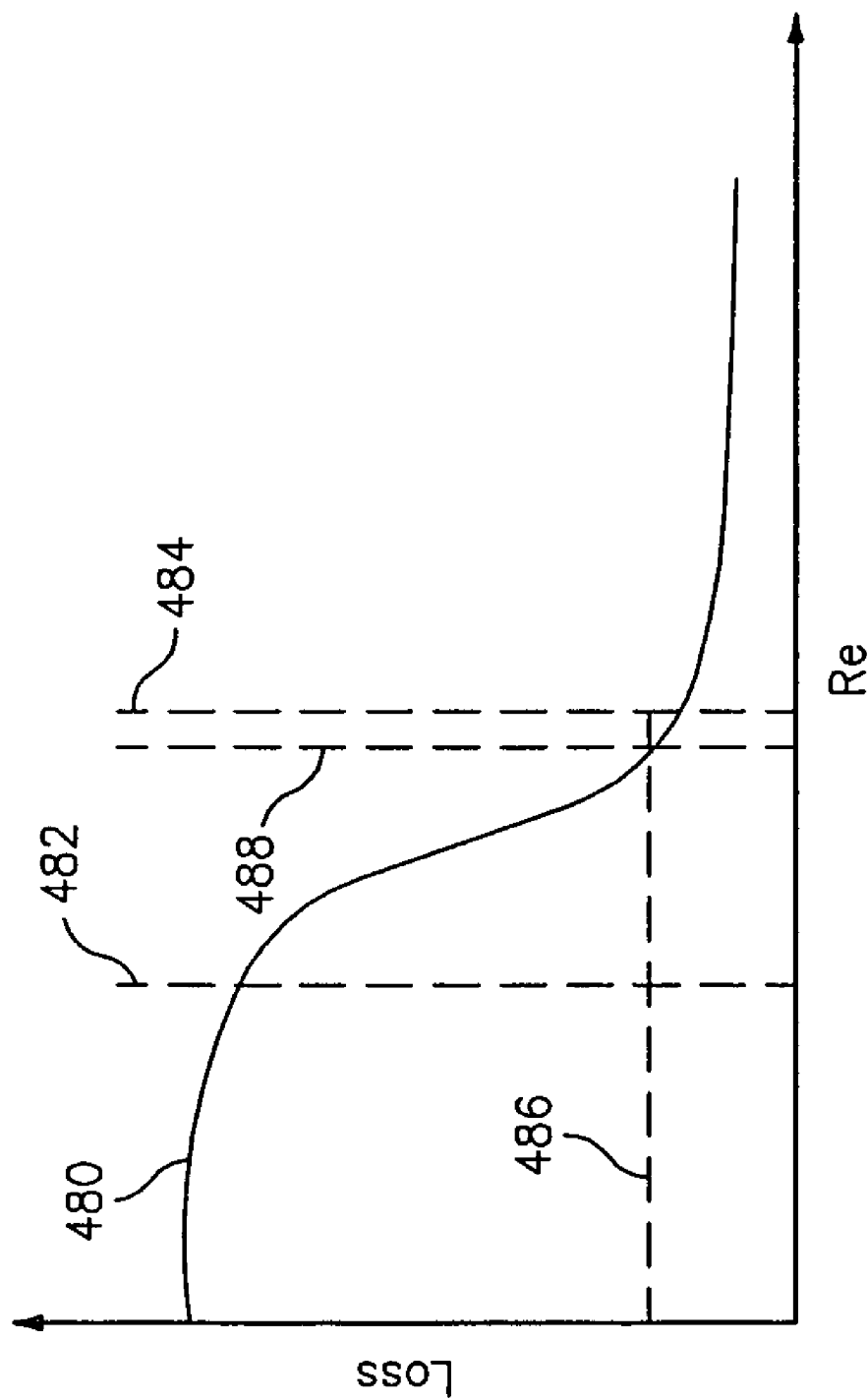
FIG. 11 is a plot of loss against Reynolds number for an exemplary airfoil.

FIG. 11 shows an exemplary plot of loss against Reynolds number for an exemplary airfoil. With reference to airfoils of a low speed turbine section of a turbine engine, low Reynolds number conditions are typically associated with aircraft cruise conditions (speed/attitude). The curve 480 is generally divided into three regions at approximate first and second Reynolds numbers 482 and 484. In the low Reynolds number region, the losses are high; in the high Reynolds number region the losses are low; and in the mid-level Reynolds number region the loss is transitioning. It is advantageous to optimize the airfoil properties as described above so that the cruise loss level 486 associated with a cruise Reynolds number 488 is as low as possible. This may typically place the cruise Reynolds number near the second Reynolds number 484, and preferably above it. The optimization may shift the curve 480 locally downward. However, given the high slope in the transition region it may be more useful to shift the intermediate portion toward lower Reynolds numbers notwithstanding that there may be very little (if any) decrease in loss in the high Reynolds number region.

Figure 13:
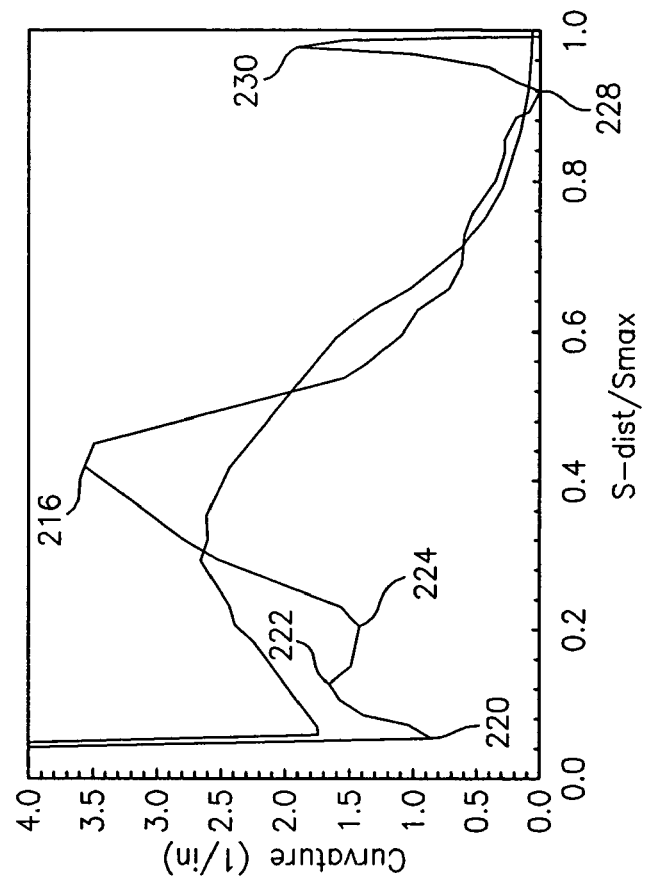
FIG. 13 is a plot of suction side curvature distribution against normalized streamwise distance for the airfoils of FIG. 12.
Figure 12:
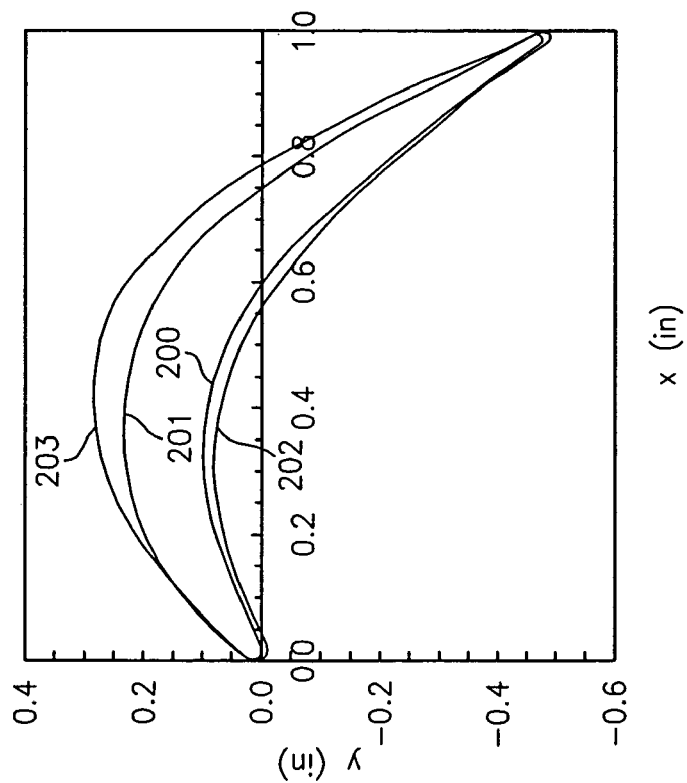
FIG. 12 is a schematic sectional view of baseline and reengineered airfoils.

FIG. 12 shows a baseline airfoil contour with pressure and suction sides/surfaces 200 and 201 and a modified airfoil contour with such sides/surfaces 202 and 203. FIG. 13 shows suction side curvature distributions for the airfoils of FIG. 12. The baseline and modified contours have approximately the same chord and axial length. Somewhat surprisingly, the modified contour is generally thicker, especially the aft 85% or so, with particular thickness increases in the vicinity of 40% axially aft to 70% axially aft. Beyond the illustrated resolution, the airfoil 202 has fine local surface perturbations which are a result of using β splines in the optimizer software. The use of β splines may be more clearly seen in the plot of FIG. 13 which shows more radical curvature departures. FIG. 13 shows the modified distribution as having a first trough 220 downstream of an off-scale first (leading edge) peak with a value well under 1.5/inch and more particularly under 1.0/inch. This occurs at a normalized spanwise distance below 0.1 (i.e., the first tenth) and more closely about 0.05. A second peak 222 is somewhat over 1.5/inch and occurs at spanwise distance of approximately 0.1. A second trough 224 occurs near a spanwise position of 0.2. A third peak 226 has a value in excess of 3/inch and well in excess of the downstream peak of the baseline distribution and occurs at a distance of approximately 0.4. A penultimate trough 228 occurs with nearly zero curvature at a distance of just over 0.9 and is followed by a sharp ultimate peak 230 of approximately 2.0/inch at a distance of greater than 0.95. Beyond the increased number of peaks and troughs, relative to the baseline distribution the modified distribution has, at a given level of resolution, a greater number of inflection points.

One or more embodiments of the present invention have been described. Nevertheless, it will be understood that various modifications may be made without departing from the spirit and scope of the invention. For example, when applied to existing CFD systems, details of the existing systems will influence or determine details of any associated implementation. Accordingly, other embodiments are within the scope of the following claims.

What is claimed is:

1. A computational fluid dynamics (CFD) method for analyzing fluid dynamic performance of a body comprising:
   determining a freestream turbulence intensity;
   determining a momentum thickness;
   determining a turbulence length scale;
   based on said freestream turbulence intensity, said momentum thickness, and said turbulence length scale, determining a first momentum thickness Reynolds number associated with a first estimated laminar/turbulent transition location along the body;
   determining an estimated laminar separation location;
   determining a spatial domain for running a turbulent flow model for modeling the fluid dynamic performance of the body, the determining of the spatial domain comprising:
      if said estimated laminar separation location is downstream of said first estimated laminar/turbulent transition location, using said first estimated laminar/turbulent transition location to determine the spatial domain; and
      if said estimated laminar separation location is upstream of said first estimated laminar/turbulent transition location, using a second estimated laminar/turbulent transition location to determine the spatial domain, the second estimated laminar/turbulent transition location being determined as a function of a momentum thickness Reynolds number associated with said estimated laminar separation location, wherein the determining the second estimated laminar/turbulent transition location comprises determining a distance of said second estimated laminar/turbulent transition location from said estimated laminar separation location as a constant multiplied by a streamwise position of said estimated laminar separation location and multiplied by an exponent of a momentum thickness based Reynolds number associated with the estimated laminar separation location; and
   running the turbulent flow model in the determined spatial domain to determine the fluid dynamic performance of the body,
   wherein:
      at least in one instance, said estimated laminar separation location is upstream of said first estimated laminar/turbulent transition location.

2. A computational fluid dynamics (CFD) method for analyzing fluid dynamic performance of a body comprising:
   determining a freestream turbulence intensity;
   determining a momentum thickness;
   determining a turbulence length scale;
   based on said freestream turbulence intensity, said momentum thickness, and said turbulence length scale, determining a first momentum thickness Reynolds number associated with a first estimated laminar/turbulent transition location along the body;
   determining an estimated laminar separation location;
   determining a spatial domain for running a turbulent flow model for modeling the fluid dynamic performance of the body, the determining of the spatial domain comprising:
      if said estimated laminar separation location is downstream of said first estimated laminar/turbulent transition location, using said first estimated laminar/turbulent transition location to determine the spatial domain; and
      if said estimated laminar separation location is upstream of said first estimated laminar/turbulent transition location, using a second estimated laminar/turbulent transition location to determine the spatial domain, the second estimated laminar/turbulent transition location being determined as a function of a momentum thickness Reynolds number associated with said estimated laminar separation location; and running the turbulent flow model in the determined spatial domain to determine the fluid dynamic performance of the body, wherein:

at least in one instance, said estimated laminar separation location is upstream of said first estimated laminar/turbulent transition location;

the determining the estimated laminar separation location comprises determining an arc distance from a stagnation point to the estimated laminar separation location; and the determining the second estimated laminar/turbulent transition location comprises determining a distance of said second estimated laminar/turbulent transition location from said estimated laminar separation location as a constant multiplied by a streamwise position of said estimated laminar separation location and multiplied by an exponent of a momentum thickness based Reynolds number associated with the estimated laminar separation location.

3. The method of claim 2 wherein:

the body is an airfoil having a pressure side and a suction side.

4. The method of claim 3 performed along the suction side.

5. The method of claim 2 further comprising:

determining whether the flow reattaches to the body and/or a location of reattachment of the flow.

6. The method of claim 2 wherein: said exponent is in a range of $-(1.22-1.32)$.

7. The method of claim 2 wherein: said constant is in a range of 211-221.

8. The method of claim 2 wherein: the first momentum thickness Reynolds number is calculated as a second constant multiplied by a second exponent of said freestream turbulence intensity multiplied by said momentum thickness divided by said turbulence length scale.

9. The method of claim 8 wherein:

the exponent is in a range of $-(1.22-1.32)$;
the constant is in a range of 211-221;
the second constant is in a range of 7.0-11.0; and
the second exponent is in a range of $-(0.8-1.1)$.

10. A method for engineering an airfoil comprising:

iteratively modifying a shape of the airfoil; and
analyzing fluid dynamic performance of the modified airfoil according to the method of claim 2.

11. The method of claim 10 applied to engineer shapes of airfoils of a plurality of rows of airfoils in a section of a gas turbine engine to reduce loss relative to a baseline under target operating conditions.

12. The method of claim 11 wherein the engineered shapes of airfoils of at least one of said rows have a greater number of inflection points on a suction side curvature profile than do shapes of airfoils of a corresponding row of the baseline and wherein there are fewer airfoils in said at least one of said rows than in the corresponding row.

13. A computational fluid dynamics (CFD) method for analyzing fluid dynamic performance of an airfoil for estimating laminar/turbulent boundary transition location comprising:

determining an estimated laminar/turbulent boundary transition location;

determining an estimated laminar separation location of a flow separating from the airfoil;

determining a first momentum thickness Reynolds number associated with said estimated laminar separation location; and determining a distance of said estimated laminar/turbulent boundary transition location from said estimated laminar separation location as a constant multiplied by a streamwise position of said estimated laminar separation location multiplied by an exponent of a momentum thickness based Reynolds number associated with the estimated laminar separation location, said exponent being in a range of $-(1.22-1.32)$ and said constant being in a range of 211-221;

using the transition location in a computational fluid dynamics (CFD) simulation of the airfoil.

14. The method of claim 13 further comprising:

determining whether the flow reattaches to the airfoil and/or a location of reattachment of the flow.

15. A computational fluid dynamics (CFD) method for analyzing fluid dynamic performance of an airfoil comprising:

determining an estimated laminar separation location of a flow separating from the airfoil;

determining a spatial domain for running a turbulent flow model for modeling the fluid dynamic performance of the airfoil, the determining of the spatial domain comprising:

using an attached flow model, determining a first estimated laminar/turbulent transition location along the airfoil;

if said estimated laminar separation location is downstream of said first estimated laminar/turbulent transition location, using said first estimated laminar/turbulent transition location to determine the spatial domain; and if said estimated laminar separation location is upstream of said first estimated laminar/turbulent transition location, using a second estimated laminar/turbulent transition location to determine the spatial domain, the second estimated laminar/turbulent transition location being determined as a constant multiplied by a streamwise position of said estimated laminar separation location and multiplied by an exponent of a momentum thickness Reynolds number associated with said estimated laminar separation location, at least in one instance, said estimated laminar separation location being upstream of said first estimated laminar/turbulent transition location; and running the turbulent flow model in the determined spatial domain to determine the fluid dynamic performance of the airfoil.

16. The method of claim 15 wherein:

said exponent is in a range of $-(1.22-1.32)$; and
said constant is in a range of 211-221.

17. The method of claim 15 wherein:

the method is applied to engineer shapes of airfoils of a plurality of rows of airfoils in a section of a gas turbine engine to reduce loss relative to a baseline under target operating conditions; and the engineered shapes of airfoils of at least one of said rows have a greater number of inflection points on a suction side curvature profile than do shapes of airfoils of a corresponding row of the baseline and wherein there are fewer airfoils in said at least one of said rows than in the corresponding row.

18. The method of claim 13 wherein:

the method is applied to engineer shapes of airfoils of a plurality of rows of airfoils in a section of a gas turbine engine to reduce loss relative to a baseline under target operating conditions; and the engineered shapes of airfoils of at least one of said rows have a greater number of inflection points on a suction side curvature profile than do shapes of airfoils of a corresponding row of the baseline and wherein there are fewer airfoils in said at least one of said rows than in the corresponding row.

19. A computational fluid dynamics (CFD) method for engineering an airfoil comprising:

iteratively modifying a shape of the airfoil; and analyzing fluid dynamic performance of the modified airfoil, the analyzing comprising:

determining a freestream turbulence intensity;

determining a momentum thickness;

determining a turbulence length scale;

determining a spatial domain for running a turbulent flow model for modeling the fluid dynamic performance of the airfoil, the determining of the spatial domain comprising:

based on said freestream turbulence intensity, said momentum thickness, and said turbulence length scale, determining a first momentum thickness Reynolds number associated with a first estimated laminar/turbulent transition location along the body;

determining an estimated laminar separation location;

if said estimated laminar separation location is downstream of said first estimated laminar/turbulent transition location, using said first estimated laminar/turbulent transition location to determine the spatial domain; and if said estimated laminar separation location is upstream of said first estimated laminar/turbulent transition location, using a second estimated laminar/turbulent transition location to determine the spatial domain, the second estimated laminar/turbulent transition location being determined as a function of a momentum thickness Reynolds number associated with said estimated laminar separation location; and running the turbulent flow model in the determined spatial domain to determine the fluid dynamic performance of the body, wherein:

at least in one instance, said estimated laminar separation location is upstream of said first estimated laminar/turbulent transition location;

the method is applied to engineer shapes of airfoils of a plurality of rows of airfoils in a section of a gas turbine engine to reduce loss relative to a baseline under target operating conditions; and the engineered shapes of airfoils of at least one of said rows have a greater number of inflection points on a suction side curvature profile than do shapes of airfoils of a corresponding row of the baseline and wherein there are fewer airfoils in said at least one of said rows than in the corresponding row.

20. The method of claim 1 wherein:

at least in one instance, said estimated laminar separation location is downstream of said first estimated laminar/turbulent transition location.

* * * * *